(12) United States Patent
McCann et al.

(10) Patent No.: US 6,516,089 B1
(45) Date of Patent: Feb. 4, 2003

(54) IN-GAMUT IMAGE REPRODUCTION USING SPATIAL COMPARISONS

(75) Inventors: John J. McCann, Belmont, MA (US); Paul M. Hubel, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/303,775

(22) Filed: Apr. 30, 1999

(51) Int. Cl.$^7$ .......................... G06K 15/00; G06K 9/00

(52) U.S. Cl. ........................................ 382/166; 358/1.9

(58) Field of Search ................................ 382/166, 167, 382/241, 278, 286; 358/517, 518, 515, 1.9

(56) References Cited

U.S. PATENT DOCUMENTS

| | | | | |
|---|---|---|---|---|
| 5,528,261 A | * | 6/1996 | Holt | 345/150 |
| 5,594,558 A | | 1/1997 | Usami et al. | 358/518 |
| 5,699,491 A | | 12/1997 | Barzel | 395/109 |
| 5,883,632 A | | 3/1999 | Dillinger | 345/431 |
| 5,907,415 A | * | 5/1999 | Yabe | 358/518 |
| 6,154,217 A | * | 11/2000 | Aldrich | 345/431 |
| 6,157,735 A | * | 12/2000 | Holub | 382/167 |
| 6,198,843 B1 | * | 3/2001 | Nakauchi | 358/1.9 |
| 6,204,939 B1 | * | 3/2001 | Lin et al. | 358/518 |
| 6,256,412 B1 | * | 7/2001 | Miyazawa | 382/216 |
| 6,282,313 B1 | * | 8/2001 | McCarthy | 382/162 |
| 6,335,983 B1 | * | 1/2002 | McCarthy | 382/162 |
| 2001/0035966 A1 | * | 11/2001 | Ohta | 358/1.9 |

FOREIGN PATENT DOCUMENTS

| | | | | |
|---|---|---|---|---|
| EP | 0574905 A2 | | 6/1993 | H04N/1/46 |
| EP | 0961 488 A2 | * | 1/1999 | H04N/1/60 |

OTHER PUBLICATIONS

John McCann; "Using Color Constancy to Advantage in Color Gamut Calculations"; Mar. 2000; pp. 169–176.

* cited by examiner

Primary Examiner—Jerome Grant, II

(57) ABSTRACT

A process and apparatus is described to improve color digital imaging reproduction quality by quickly, accurately and robustly mapping the gamut associated with a color digital image to the gamut of a particular device in a visually pleasing way. The improvement in appearance of the in-gamut reproduction is based on using calculations similar to those used by the human visual system, namely spatial comparisons. The new approach synthesizes a new reproduction image based on spatial comparisons rather than pixel matches. These spatial comparisons are made first at large spatial separations (or smallest multi-resolution image) with the output interpolated to make the old for the next smaller spatial-separation image (multi-resolution image). Ratio, product, reset, average, resize calculations are made to calculate old intermediate image at this spatial separation (image size). The process continues until spatial resolution equals 1.0 (full resolution). Alternatively, rather than using multi-scalar images, ratios are calculated from a single resolution image using increasingly smaller distances within the image. An important aspect of this invention is that instead of calculating the appearance of an image from the radiance found in the scene, it can use both the Goal (original) and the Best images to calculate a resulting new image that has the same spatial comparisons as the original in Media A, within the gamut of Media B. This technique is also helpful when applied to prior spatial comparison methods for images having a limited dynamic range. This invention allows the user to calculate new values for all pixels in an image so as to look like another image with completely different colorimetric values.

35 Claims, 11 Drawing Sheets

(3 of 11 Drawing Sheet(s) Filed in Color)

Convetional Process

Original Image

X Y Z
OR
Lab

Reproduction Image

X' Y' Z'
OR
Lab'

Spatial Process

Original Image $\dfrac{X_I}{X_{II}}, \dfrac{Y_I}{Y_{II}}, \dfrac{Z_I}{Z_{II}}$

OR $\dfrac{L_I}{L_{II}}, \dfrac{a_I}{a_{II}}, \dfrac{b_I}{b_{II}}$

Reproduction Image $\dfrac{X'_I}{X'_{II}}, \dfrac{Y'_I}{Y'_{II}}, \dfrac{Z'_I}{Z'_{II}}$

OR $\dfrac{L'_I}{L'_{II}}, \dfrac{a'_I}{a'_{II}}, \dfrac{b'_I}{b'_{II}}$

Figure 11 BOUT

IN-GAMUT IMAGE REPRODUCTION USING SPATIAL COMPARISONS

BACKGROUND OF THE INVENTION

1. Field of the Invention

The present invention relates to digital image processing and, more particularly, to gamut mapping for color digital images.

2. Description of the Related Art

Modem technology has made it easy to print or display color images. Such images are typically generated by computer, scanned-in or otherwise captured by a digital or video camera. Frequently, however, a reproduced image is not as visually pleasing as one would prefer. One source of disappointment in the reproduced image occurs when the color gamut of the original image contains pixels having a color outside of the gamut which can be produced by the output device.

FIG. 1 is a diagram which schematically illustrates the out-of-gamut problem for an image in CIELAB space. In FIG. 1 it can be seen that image gamut 110 does not coincide with output gamut 120. Simply put, there are colors in input image 110 which cannot be reproduced by the output device because they are not part of output gamut 120. There are many ways to modify an input image so it can be reproduced using a color gamut of a particular output device. Such techniques are well known in the art and are typically called "gamut mapping" or "gamut compression" techniques. For simplicity, the term "gamut mapping" will be used hereafter as a generic term to describe all of these techniques. It is to be understood, however, that unless otherwise indicated, a reference to gamut mapping techniques shall also encompass gamut compression techniques. A survey of typical gamut mapping techniques can be found in Chapter 2 of the Ph.D. thesis of Ján Morovič, *To Develop a Universal Gamut Mapping Algorithm*, University of Derby, published October 1998, at pages 7–64 (Condensed format edition).

Briefly stated, the typical conventional way to make a reproduction look the same as the original is to colorimetrically match the colors pixel by pixel. When the reproduction media has a smaller gamut than the original image, matching all pixels is impossible. Yet, all extra-gamut pixels have to be mapped individually back into the color space. Algorithms that do pixel by pixel mapping are forced to choose between two bad alternatives. If they map all extra-gamut pixels to the nearest in-gamut color, then many different colors in the original will be mapped to the same color, thereby losing details in the reproduction and creating visually apparent false details. If instead, they map the extra-gamut colors to a distribution of different colors within the gamut colors, one substantially increases the number of non-matching, desaturated pixels in the image. Both choices yield poor reproductions.

Thus, it can be seen that gamut mapping techniques impose color image reproduction quality limits upon color digital imaging processing devices, and hinder the use of these devices in many applications.

Therefore, there is an unresolved need for a gamut mapping technique that can improve color digital imaging reproduction quality by quickly, accurately and robustly mapping the gamut associated with a color digital image to the gamut of a particular device in a visually pleasing way.

SUMMARY OF THE INVENTION

A process and apparatus is described to improve color digital imaging reproduction quality by quickly, accurately and robustly mapping the gamut associated with a color digital image to the gamut of a particular device in a visually pleasing way.

The improvement in appearance of the in-gamut reproduction is based on using calculations similar to those used by the human visual system, namely spatial comparisons. The new approach synthesizes a new reproduction image based on spatial comparisons rather than pixel matches.

For one embodiment, the process begins by describing the color of the original image in Media A in a three-dimensional color space. This is called the GOAL image. Ideally, it is in an isotropic space, such as Lab. Second, we have the reproduction image in a second Media B, but described in the same color space. Because the color gamut of Media B is smaller than that of Media A, this image is the best match possible within the confines of the smaller color gamut. It is calculated, pixel by pixel to find the closest match to the original Media A colors in Media B. This intermediate image is called the BEST image.

The calculation uses the model of human vision. For one embodiment, it begins by converting the (original) Goal and Best Images to their r, g, b (i.e., red, green, blue) color separation channels. Note that alternatively, different channels could be used, such as Yuv, or Lab luminance-chrominance channels. Then it makes spatial comparisons between different areas in the red channel Goal image, Goalr. For example, it may take ratios of intensities at two different locations: x, y and x', y'. Next it integrates these spatial comparisons across the image. This is accomplished, for example, by multiplying the old value of Bestr (the Best red channel image) at x,y by the ratio (goalr $x_{x',y'}$/goalr$_{x,y}$) to make the new product at x', y'. The results are then normalized (reset). The results from different spatial integrations are averaged.

These spatial comparisons are made first at large spatial separations (or smallest multi-resolution image) with the output interpolated to make the old for the next smaller spatial-separation image (multi-resolution image). Ratio, product, reset, average, resize calculations are made to calculate old intermediate image at this spatial separation (image size). The process continues until spatial resolution equals 1.0 (full resolution). This old image is the final output separation. One repeats ratio, product, reset, average, resize steps for g and b separations. The r, g, b final separations are then reassembled into the resulting new BOUT image in color.

Alternatively, rather than using multi-scalar images, ratios are calculated from a single resolution image using increasingly smaller distances within the image.

An important aspect of this invention is that instead of calculating the appearance of an image from the radiance found in the scene, it can use both the Goal and the Best images to calculate a resulting new image that has the same spatial comparisons as the original in Media A, within the gamut of Media B. This technique of using a Goal (original) and Best image is also helpful when applied to prior spatial comparison methods for images having a limited dynamic range.

This invention allows the user to calculate new values for all pixels in an image so as to look like another image with completely different colorimetric values.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee. The invention will be readily understood by the following detailed description in conjunction with the following drawings, wherein like reference numerals designate like structural elements, and in which.

DETAILED DESCRIPTION OF THE INVENTION

Embodiments of the invention are discussed below with reference to FIGS. 1–11. Those skilled in the art will readily appreciate that the detailed description given herein with respect to these figures is for explanatory purposes, however, because the invention extends beyond these limited embodiments.

Figure 1:
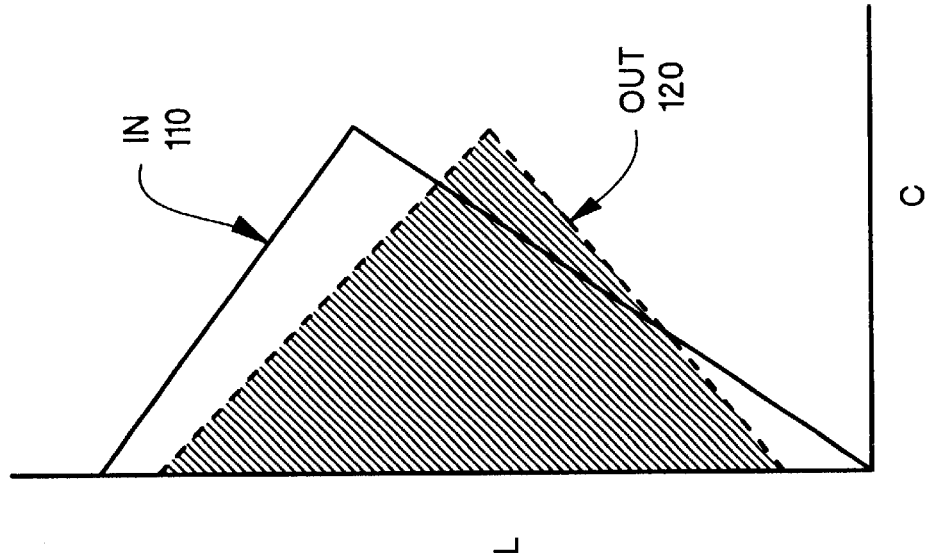
FIG. 1 is a diagram illustrating the out-of-gamut problem for an image.
Figure 2:
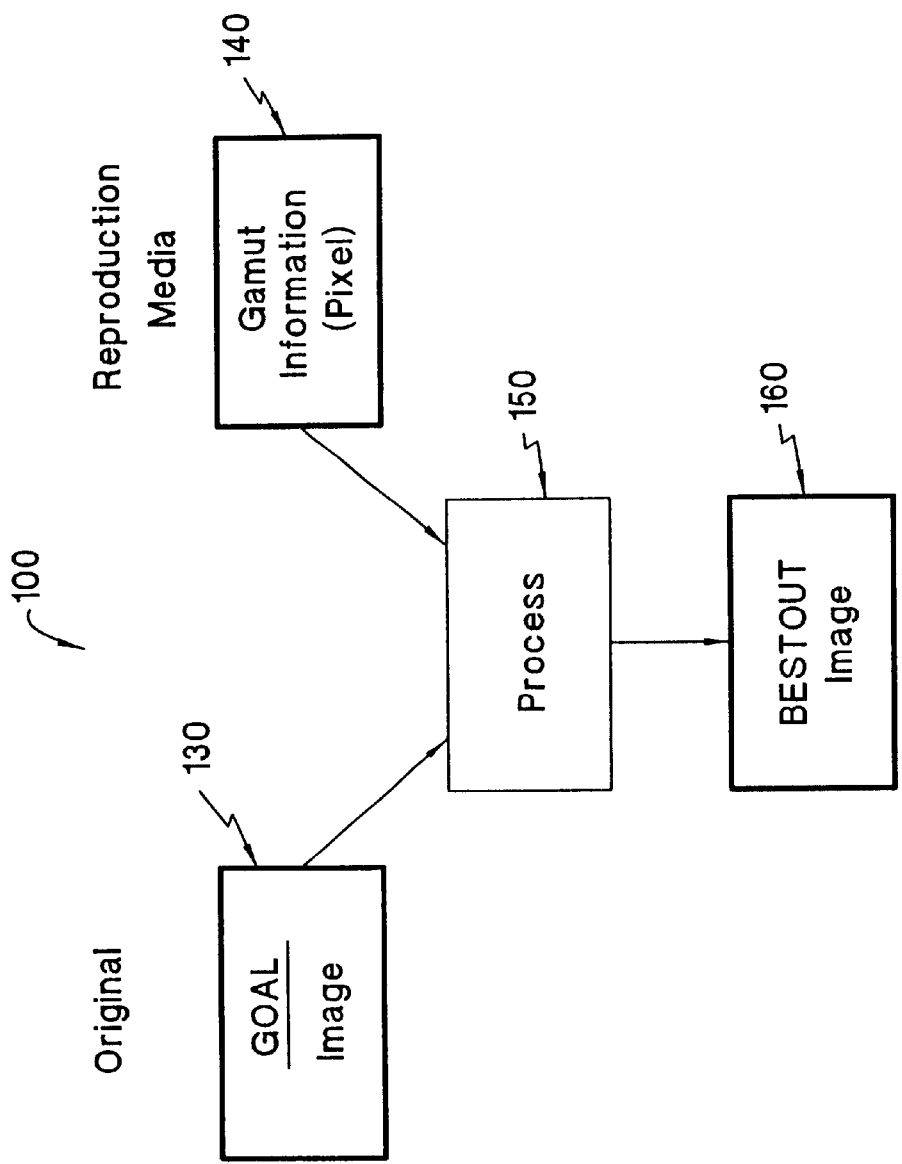
FIG. 2 is a block diagram illustrating a digital imaging system having a spatial comparison processor for in-gamut image reproduction according to the present invention.

FIG. 2 is a block diagram illustrating a digital imaging system 100 having a spatial comparison processor 150 for in-gamut image reproduction according to the present invention. As such, FIG. 2 provides an overview diagram of one embodiment of the invention. System 100 calculates from an Original image (GOAL Image 130), a second Reproduction image (BESTOUT image 160) that appears as close as possible to the Original image, despite the fact that it is rendered by a media with a different color gamut. The Original GOAL image 130 provides input data to the calculation. Gamut Information 140 about the reproduction media also provides input data to process 150. Using this data describing the gamut of the reproduction media, process 150 calculates the resulting BESTOUT 160 In-Gamut Image.

Imaging system 100 may be a single, integrated unit, or may be formed from discrete components, either singly or in combination. Image capture of Original image 130 can be achieved by any of the wide variety of image capture units including a digital camera (still or video), or a scanner. As used herein, the term "capture" is applied broadly. For example, it might be the case that colors created in a spreadsheet graph might appear distinct when viewed on a display, but be hard to differentiate when printed on a transparency unless processed using the spatial comparison approach. Thus, for example, within the context of this description, original image 130 can be a computer-generated image that was formed using one or more computer-generated sources. Also as used herein, the term "original" is applied broadly. For example, it might be the case that an image captured by a digital camera might have been altered by a digital photo processing technique before becoming an "original" image. Similarly, image reproduction of resulting Reproduction image 160 can be achieved by any of the wide variety of image reproduction units including a units for storage, display, printing, or the like.

For another example, it may be the case that processor 150 is separate from the image capture unit or from the reproduction unit, or from both. In such a case, the actual reproduction unit (and its associated color gamut) may be unknown. This situation could occur, for example, when preparing an image for transmission across the Internet. In such a case, the reproduction image 160. can be created by using a generic color gamut to estimate the target color gamut of the target reproduction device.

For yet another example, it may also be used to convert from one color space to another, such as from device RGB space to a standard RGB space (e.g., sRGB). In such a case, when standard conversions are performed, data loss may occur during conversion from one space to the other, for example, because of clipping. This loss can be avoided, however, by mapping using spatial comparisons.

In accordance with the present invention, the Original image 130 is processed to provide a Reproduction image 160 having a color gamut within the target gamut of the target reproduction device. The processing involves mathematical manipulation of the image data, which can be performed by a programmable device, such as a microprocessor or digital signal processor, either within, or external to the input capture device (e.g., in a host computer, or in the output unit). Furthermore, the components of digital imaging system 100 are described as examples of devices which perform particular functions within a digital imaging system. Accordingly, the functions which are described as being performed within the digital imaging system may be performed by any device that is capable of performing the particular functions. For example, the processor unit 150 may be a microprocessor, an application specific integrated circuit, a discrete circuit, a state machine, or any other circuit or component that is capable of performing the functions that are described.

Figure 3:
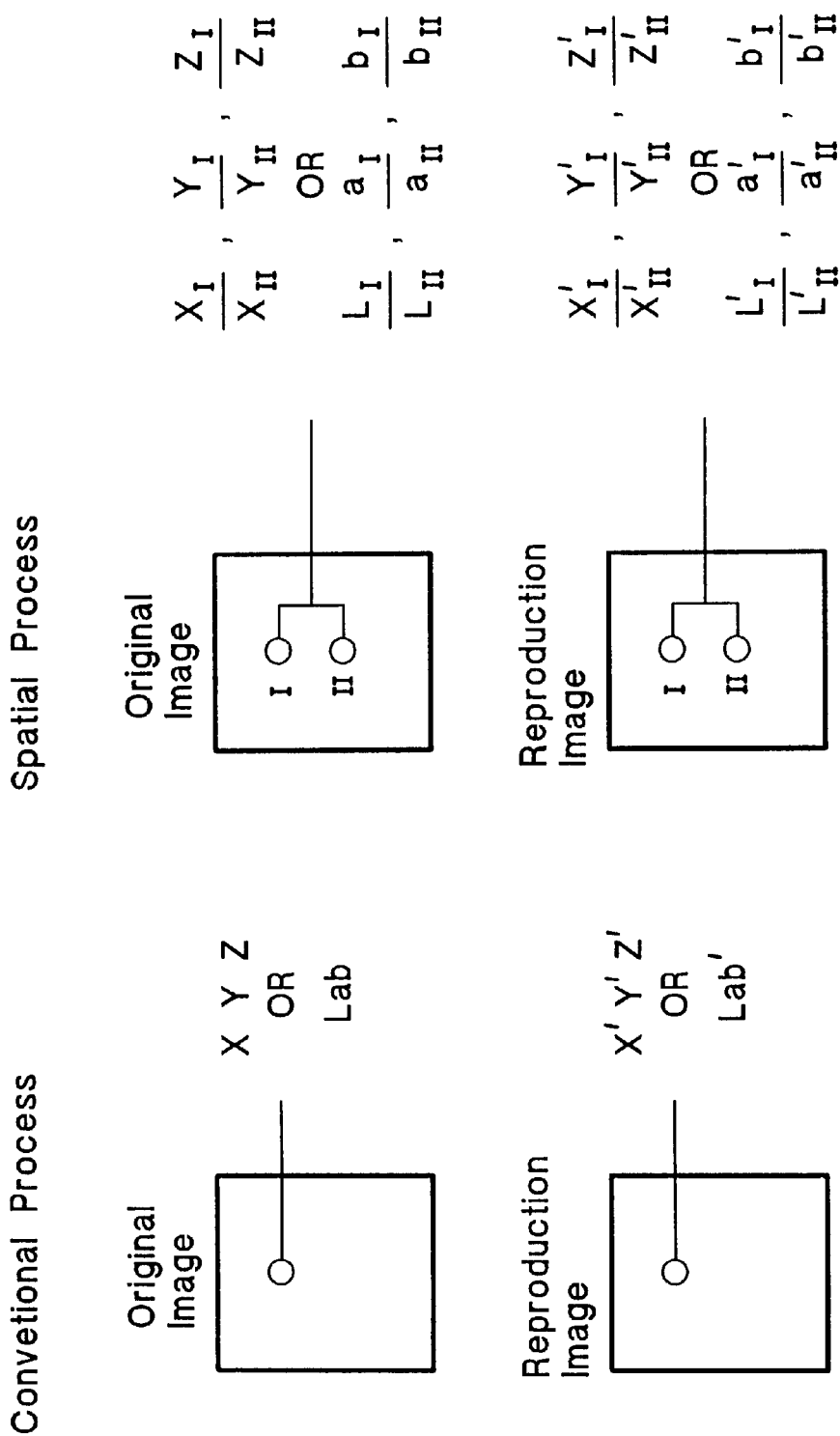
FIG. 3 is a diagram illustrating calculation of an in-gamut reproduction image according to conventional processes and according to an embodiment of the present invention.

FIG. 3 is a diagram illustrating calculation of an in-gamut reproduction image according to conventional processes and according to an embodiment of the present invention. For one embodiment of the present invention the process uses spatial comparisons found in the Original Goal Image by comparing the response to position I of the image (which might have coordinates x,y) to the response to position II (which might have coordinates x',y'). The above comparison is used to evaluate and modify the Reproduction Image. The Reproduction Image is modified to become more like the Original Image using the spatial comparison information from the original.

The process is distinguished from conventional solutions to the gamut mapping problem by the use of spatial comparisons in both the Original and the Reproduction. Conventional processes typically measure light intensity values (XYZ or Lab) from one pixel and attempt to match that pixel in the reproduction. As will be described in greater detail below, the present invention improves on the one-pixel approach by using spatial comparisons that mimic human visual processing.

Figure 4:
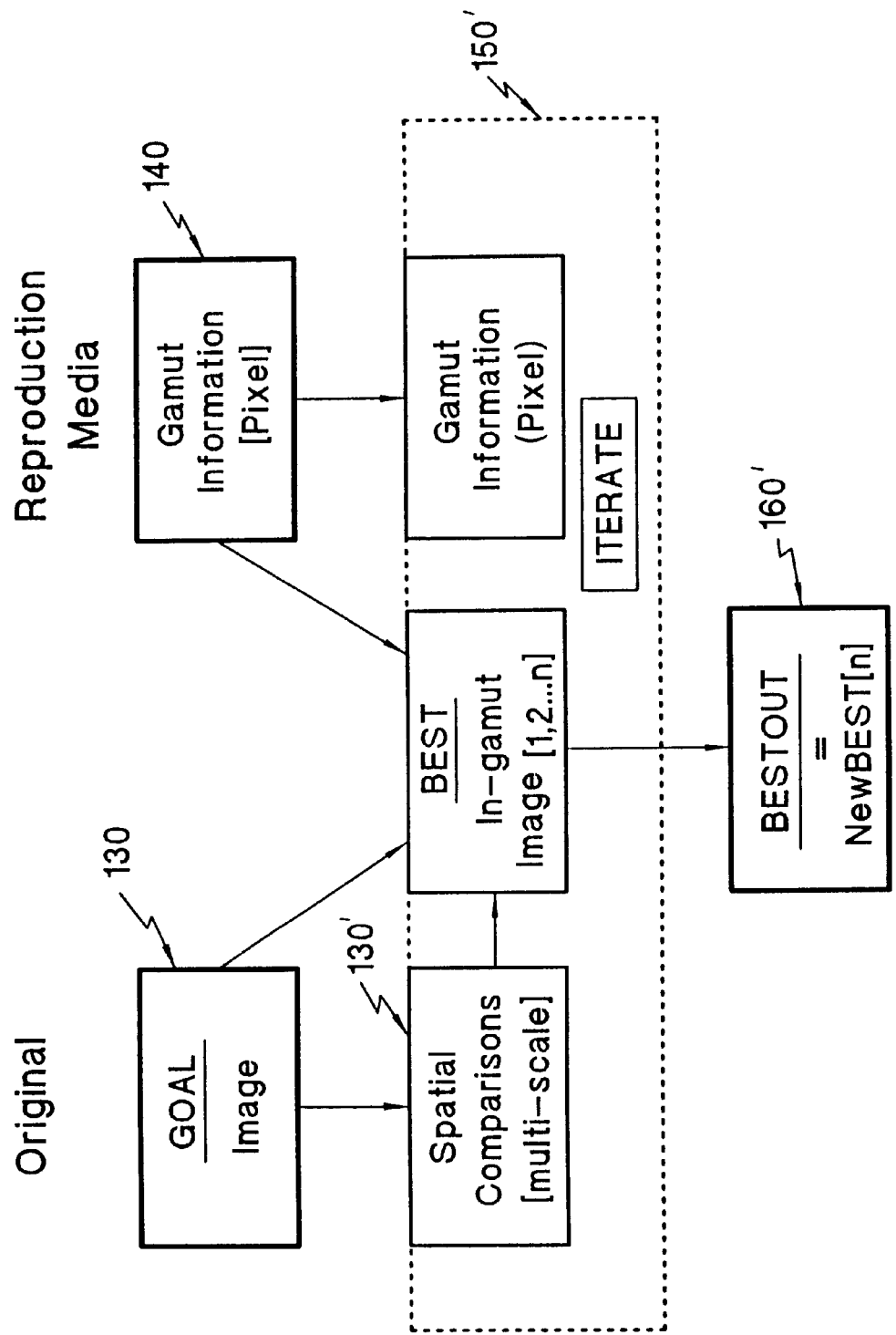
FIG. 4 is a diagram illustrating calculation of an in-gamut reproduction image according to an embodiment of the present invention.

FIG. 4 is a diagram illustrating calculation of an in-gamut reproduction image according to an embodiment of the present invention. Within FIG. 4, process block 150' illustrates a multi-resolution embodiment of process 150 of FIG. 1. The operation begins by forming an initial BEST In-gamut Intermediate Image from Goal (original) Image 130 and Gamut Information 140. As will be discussed in greater detail in connection with FIG. 6, this is accomplished, for example, by using any of a number of techniques that read input image data, pixel by pixel, and evaluate whether the input is within the gamut of the reproduction media. If out-of-gamut, the associated pixel input to the BEST In-gamut Image is replaced by an in-gamut value.

The iterative layer of the calculation of process 150' introduces multi-scale spatial comparisons 130'. The Original GOAL Image 130 is repeatedly sampled to obtain multi-scale Spatial Comparisons 130'. This Spatial GOAL information is combined with the BEST In-gamut image to form the New BEST In-Gamut Intermediate Image. The operation is repeated N times to generate the output image BESTOUT 160 (which is NewBEST$_n$). The middle layer calculations iteratively impose the gamut limit (BEST In-gamut Image) on the NewBEST$_{I(I=1, 2, 3, \ldots N)}$ Image that has been altered with spatial comparisons from the original GOAL Image 130.

Figure 5:
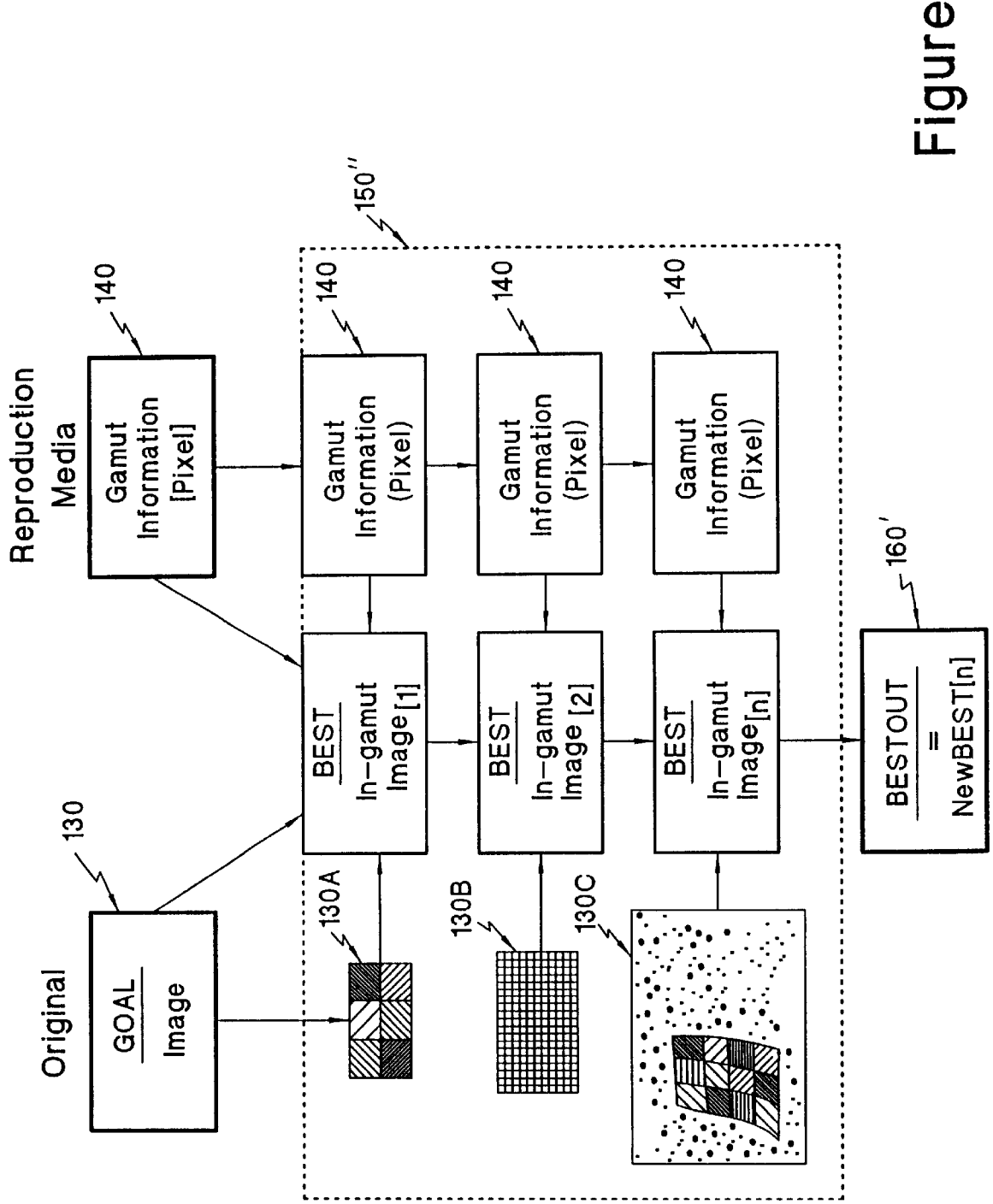
FIG. 5 is a diagram illustrating multi-scale spatial resolution calculations of an in-gamut reproduction image according to the embodiment of FIG. 4.

FIG. 5 is a diagram further illustrating multi-scale spatial resolution calculations of an in-gamut reproduction image according to the embodiment of FIG. 4. In FIG. 4, process block 150' of FIG. 4 has been expanded into block 150" to show operation of the process at three resolution iterations. Images 130A, 130B and 130C represent different resolution scale versions of GOAL (original) Image 130. Image 130A is the lowest (coarsest) resolution version of GOAL Image 130. An initial In-Gamut version of GOAL Image 130 is formed using Gamut Information 140. Spatial comparisons derived from (lowest resolution) Image 130A are applied to the original In-gamut version of the GOAL Image 130 to form Intermediate BEST In-Gamut Image$_1$. As will be discussed in greater detail in connection with FIG. 7, a RESET operation is also performed by applying Gamut Information 140 to BEST In-gamut Image$_1$ to return to within the gamut any pixels of BEST In-gamut Image$_1$ that went out-of-gamut when the spatial comparisons were applied.

Next spatial comparisons derived from (next-lowest resolution) Image 130B are applied to the Intermediate BEST In-Gamut Image$_1$ (just formed) to make BEST In-Gamut Image$_2$. Again, a RESET operation is performed by applying Gamut Information 140 to BEST In-gamut Image$_2$ to return to within the gamut any pixels of BEST In-gamut Image$_2$ that went out-of-gamut when the spatial comparisons from Image 130B were applied.

This process iterates at successively higher resolution levels until the highest (finest) resolution Image 130C is reached. At final step, spatial comparisons derived from (highest resolution) Image 130B are applied to the Intermediate BEST In-Gamut Image$_{n-1}$ to make BEST In-Gamut Image$_n$. As before, a RESET operation is performed by applying Gamut Information 140 to BEST In-gamut Image$_n$ to return to within the gamut any pixels of BEST In-gamut Image$_n$ that went out-of-gamut when the spatial comparisons from Image 130C were applied. The Intermediate BEST In-gamut Image$_n$ then becomes the resulting BESTOUT image 160'.

Figure 6:
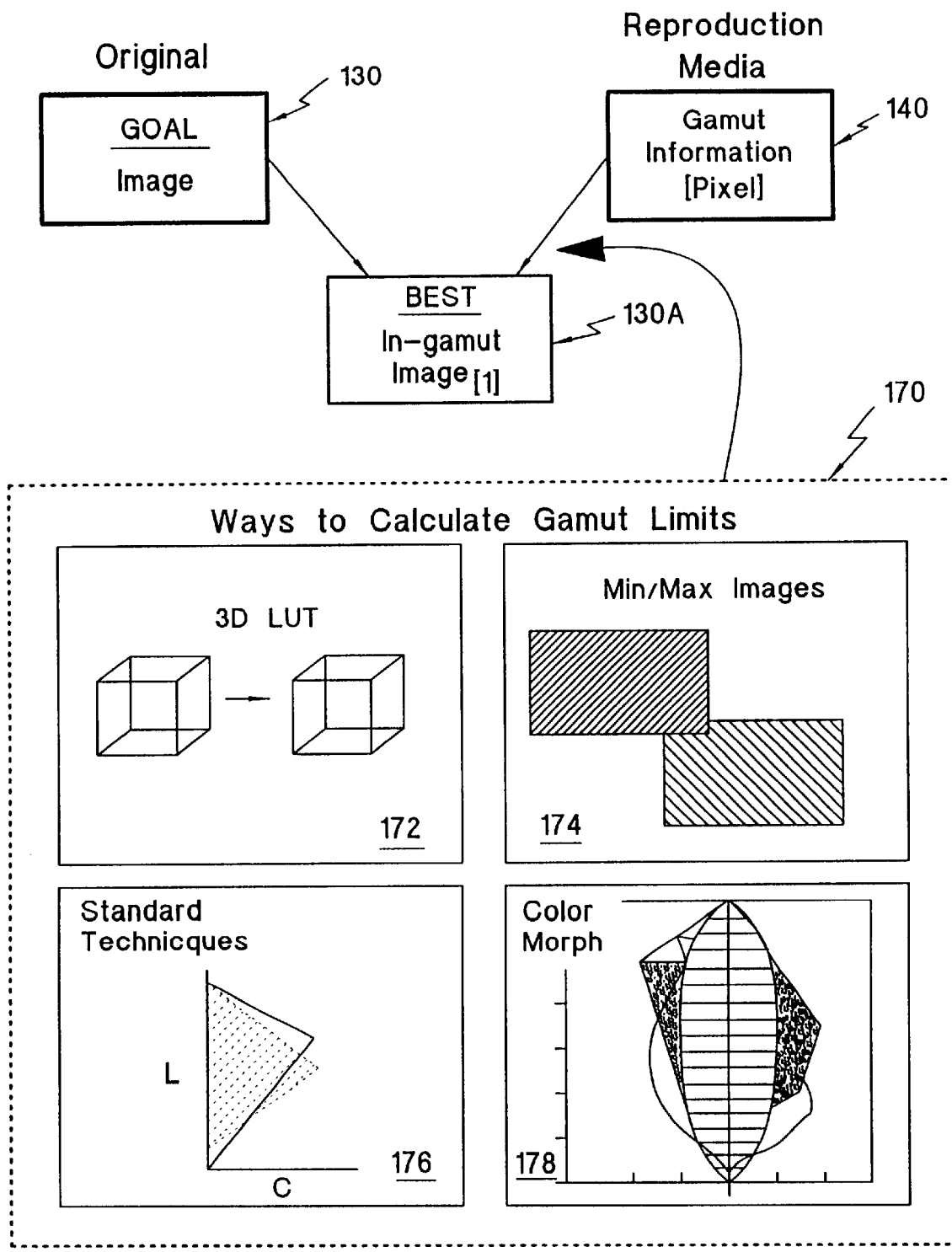
FIG. 6 is a diagram illustrating alternative approaches to calculating gamut limits for the present invention.

FIG. 6 is a diagram illustrating alternative approaches to calculating gamut limits for the present invention. As has been shown previously, there are occasions during the process of the present invention when an intermediate image is adjusted to impose the gamut of the output media onto the image. One such occasion is at the beginning of the iterative process when forming the initial In-gamut version of the GOAL Image 130. Other such occasions occur during the RESET operation at the end of each iteration. Block 170 illustrates a "black box" which adjusts an image back into a known gamut. Block 170 is a black box in the sense that any of a variety of techniques known in the art could be used to perform this process. Sub-blocks 172, 174, 176 and 178 within block 170 represent families of techniques that could be used to perform this task.

One family is that of LUT (look-Up Table) 172. For example, in the case where a pixel color is represented as an 3-tuple, this LUT is typically implemented as a 3-dimensional LUT. For each pixel being considered, the 3-tuple color values of the pixel index into a value in the LUT. If the color of the pixel is within the gamut of the media, then the value in the LUT will simply be the color of the pixel. If, however, the color of the pixel is not within the gamut of the media, then the value in the LUT will be the in-gamut color for the pixel.

Another family is that of Min/Max Images 174. The image is compared on a pixel by pixel basis to one or both of Minimum and Maximum In-gamut versions of the GOAL image. For each pixel being considered, the color value of the pixel is compared to a previously calculated minimum or maximum value for that pixel. If the color of the pixel is within the gamut of the media (i.e., within the minimum and maximum), then the value of the color of the pixel will not be changed. If, however, the color of the pixel is not within the gamut of the media, then the value of the color for the pixel will be set to the appropriate minimum or maximum in-gamut value.

Family 176 is set of standard pixel-by-pixel gamut mapping techniques of the sort described in the survey of gamut mapping techniques found in Chapter 2 of the Ph.D. thesis of Jàn Moroviĉ, *To Develop a Universal Gamut Mapping Algorithm*, University of Derby, published October 1998, at pages 7–64 (Condensed format edition).

Family 178 is set of color morphing techniques of the sort described in U.S. Pat. No. 5,539,540, Spaulding et al., Method and Associated Apparatus for Transforming Input Color Values in an Input Color Space to Output Color Values in an Output Color Space or U.S. Pat. No. 5,583,666, Ellson et al., Method for Cross-Device Color Calibration and Enhancement using Explicit Constraints.

Note also a portion of an image can be reset for example to "anchor" a portion to a particular spot color, which may be in or outside of the original color gamut. For example, a company logo may have a color that is not part of the original gamut but may be within the target gamut (or at least there may be a closer match within the target gamut). In such a case, it is desirable to reproduce the known color. In fact, even when the spot color is within the original gamut, there may be benefit to resetting a spot color to exactly match in the target gamut. Therefore, resetting to the spot color (or colors) will ensure that the resulting image appears visually pleasing. The spot color reset can be performed before or after other reset operations and can be performed more than once. Resetting to a spot color would have application in selling merchandise across the Internet in cases where color is important. Also note that a plurality of independent gamut restrictions 140 can be applied to the intermediate image. For example, these restrictions can be derived from spot color data in a first color space and Lab data in a second color space and sRGB data in a third color space, all used in the same iterative calculation of the resulting image. Furthermore, the spot color could actually be a restricted gamut range. This would be useful, for example, to anchor a face in a portrait image (recognized e.g., by a face recognition algorithm) to within a natural flesh tone color gamut that would include a range of skin pigment colors.

Figure 7:
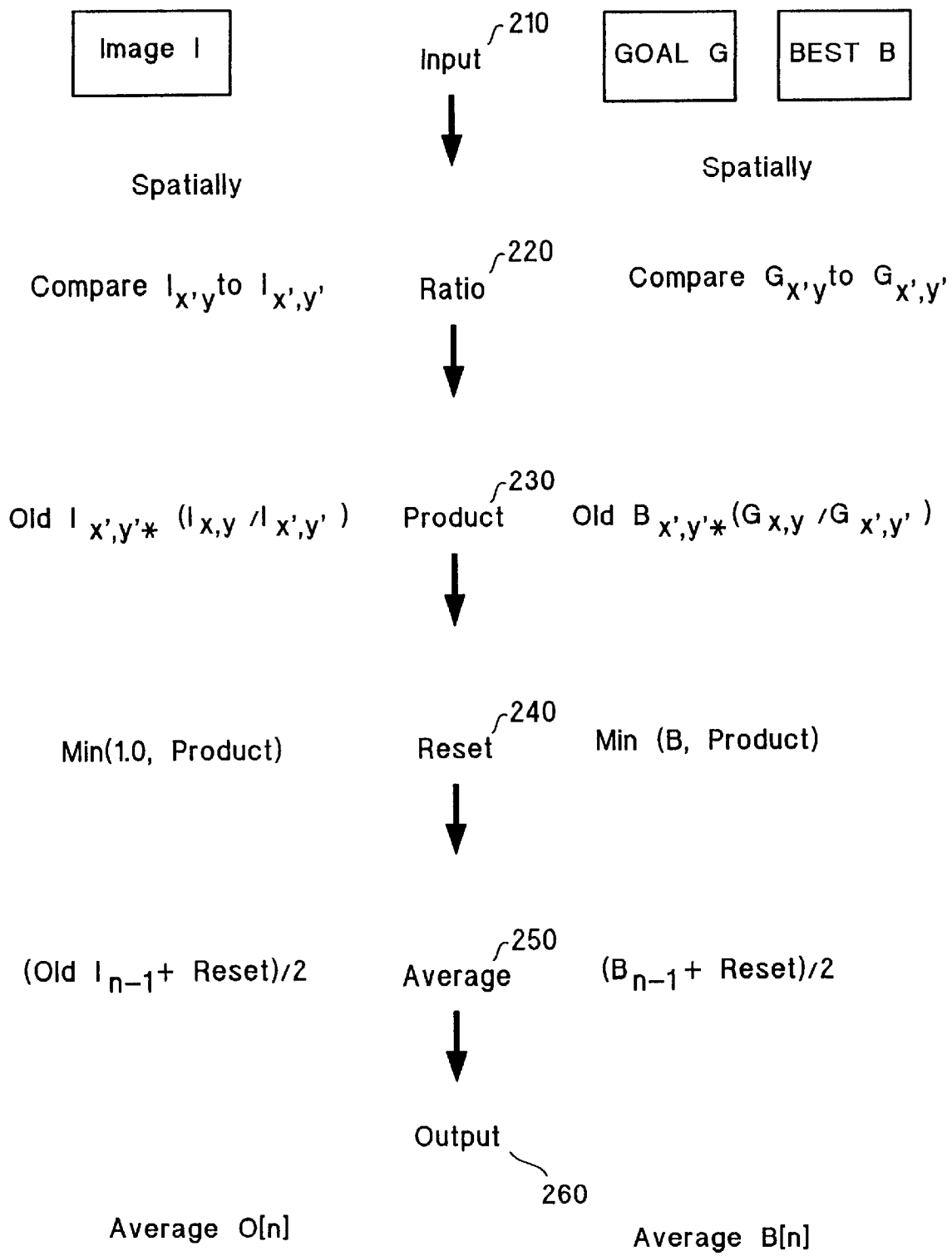
FIG. 7 is a diagram illustrating differences between the present invention and a prior spatial comparison method for images having a limited dynamic range.

FIG. 7 is a diagram illustrating differences between the present invention and a prior spatial comparison method for images having a limited dynamic range. The improvement in appearance of the in-gamut reproduction is based on using calculations similar to those used by the human visual system, namely spatial comparisons. The goal of this new algorithm is to synthesize a new reproduction image based on spatial comparisons rather than pixel matches. Experiments in the literature show that spatial comparisons are more important than pixel by pixel matches. (See, McCann, J. J., Color Theory and Color Imaging Systems: Past, Present and Future, J.I.S.T., 42, 70, 1998.)

The process begins by describing the color of the original image in Media A in a three-dimensional color space. This is called the GOAL or original image. Ideally, it is in an isotropic space, such as Lab. Second, we have the reproduction image described in the same color space. Because the color gamut of Media B is smaller than that of Media A, this image is the best match possible within the confines of the smaller color gamut. It is calculated, pixel by pixel to find the closest match to the original Media A colors in Media B. This is called the BEST image.

The calculation uses the model of human vision described by Land and McCann. (See, Land, E. H. and McCann, J. J., U.S. Pat. No. 3,553,360; January 1971; Land, E. H., Ferrari, L., Kagan, S. and McCann, J. J., U.S. Pat. No. 3,651,252; March 1972; Frankle, J. and McCann, J. J., U.S. Pat. No. 4,384,336; May 1983.)

This model described by Frankle and McCann is illustrated in the left side of FIG. 7. The object of those techniques was to calculate the appearance of an image from the radiance coming from the scene. Here we have a different process illustrated in the right side of FIG. 7. The present invention can use two images, Goal and Best. The present invention also uses the ratio, product, reset, average steps found in previous techniques, but to solve the problems of gamut mapping, the objectives, inputs and resets are different from these earlier techniques.

For one embodiment, the gamut mapping begins by converting the Goal and Best Images to their r, g, b (i.e., red, green, blue) color separation channels for input 210. Then it makes spatial comparisons between different areas in the Goalr image (i.e., the red channel Goal image). For example, it takes ratios 220 of intensities at two different locations: x, y and x', y'. Next it integrates these spatial comparisons across the image. For example, it will multiply the old value of Bestr (i.e., the red channel Best Image) at x,y by the ratio(goalr$_{x',y'}$/ goalr$_{x,y}$) to make the new product 230 at x', y'. The results are then normalized (reset 240). The results from different spatial integrations are averaged 250.

These spatial comparisons are made first at large spatial separations (or smallest multi-resolution image) with the output interpolated to make the old for the next smaller spatial-separation image (multi-resolution image). Ratio, product, reset, average, resize calculations are made to calculate old image at this spatial separation (image size). The process continues until spatial resolution equals 1.0 (fill resolution) This old image is the final output 260 separation. One repeats ratio, product, reset, average, resize steps for g and b separations. The r, g, b final separations are then reassembled into the resulting new BOUT image in color.

An important distinction between this invention and previous techniques is step 230. Here the Best$_{x,y}$ is multiplied by the Goal$_{x,y}$/Goal$_{x',y'}$ ratio. Thus, Old product and ratio come from different images. They are also reset differently in step 240.

Note that by working in a logarithmic space, multiplication operations can be performed by addition, thereby increasing the speed of calculation.

Also note that, while differing from pixel by pixel adjustments, this approach also differs from homomorphic filtering such as that described by Voicu et al, "Practical considerations on color image enhancement using homomorphic filtering", Journal of Electronic Imaging, January 1997, vol. 6(1), pp. 108–113. This difference can easily be seen because the non-linear nature of the spatial comparisons of the present invention are decidedly non-homomorphic.

A novel aspect of this invention is that instead of calculating the appearance of an image from the radiance found in the scene, it can use both the Goal and the Best images to calculate a new image that has the same spatial comparisons as the original in Media A, within the gamut of Media B. Thus, for one embodiment:

Old=Best

New$_{x',y'}$=old$_{x,y}$*(goal$_{x',y'}$/goal$_{x,y}$)

New$_{x',y'}$=min(new$_{x',y'}$, best$_{x',y'}$)

New$_{x',y'}$=max(new$_{x',y'}$, 0)

Old$_{x',y'}$=(sum(new$_{n=1, \ldots, NN}$)/NN)

In the above equation, NN is the number of nearest neighbors for a particular pixel, and can vary by resolution. For example, at a coarse resolution, one may be operating on a 2×3 array, and NN would equal 5. On the other hand, at a finer resolution, one may be operating on a 4×6 array, and NN would equal 8.

This technique of using a Goal and Best image is also helpful when applied to prior spatial comparison methods for images having a limited dynamic range. In some circumstances the Goal image is a record of radiances from a scene that has a very wide range of radiances. The Best image is restricted by a low radiance range media, such as a reflective print. By using the limited range of the print, we can calculate a Best image. Using spatial comparisons from the Goal, we can efficiently calculate a BestOut image that displays all of the details of the Goal in the range of the Best. Thus, for example, the Goal image may have a dynamic range of 0–255 while the display may have a dynamic range half that size. In such a case one could begin with a Best image formed from the Goal image such that the values in the Best image range from 0–128.

Figure 8:
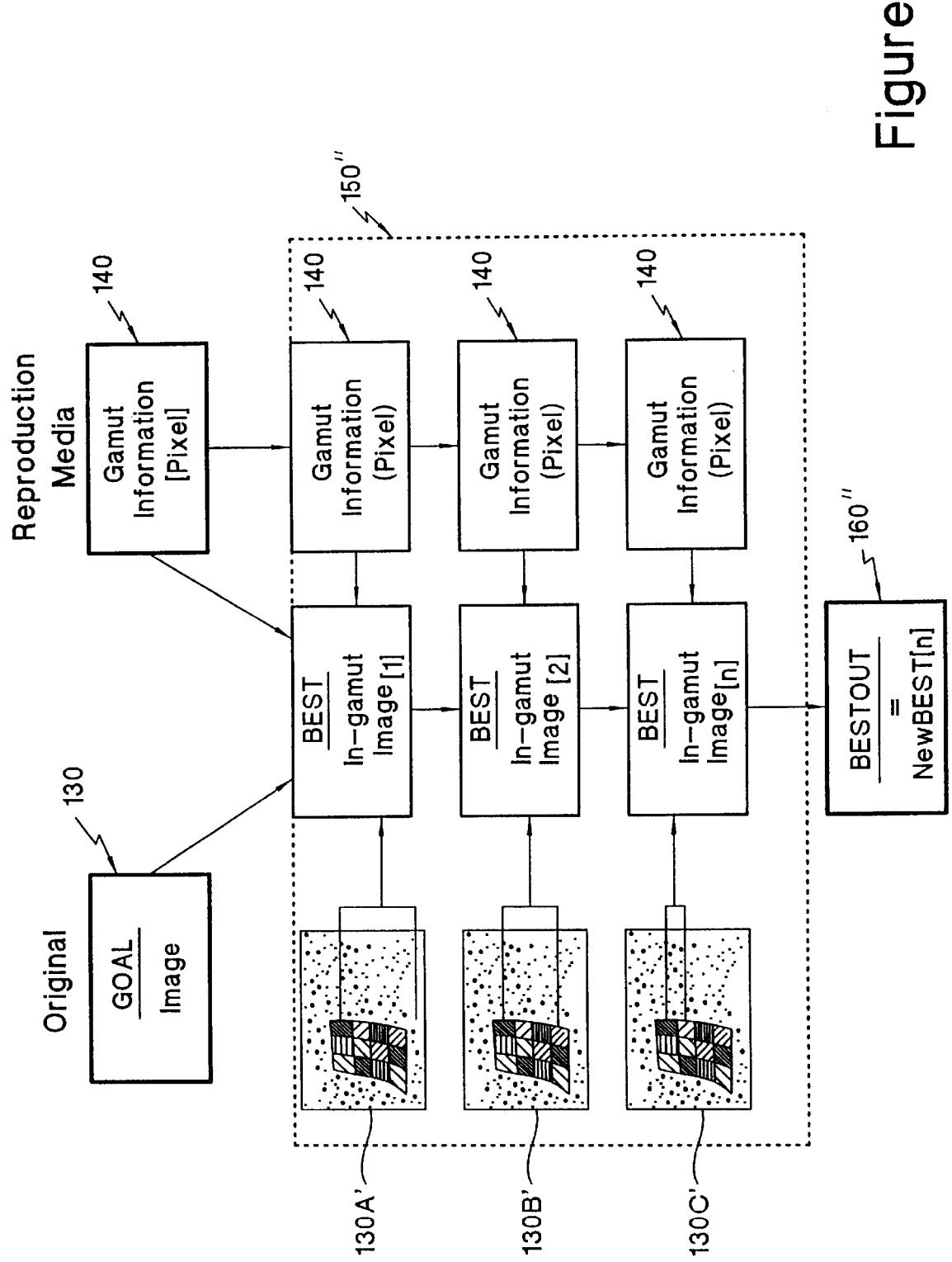
FIG. 8 is a diagram illustrating calculation of an in-gamut reproduction image according to an alternative embodiment of the present invention.
Figure 9:
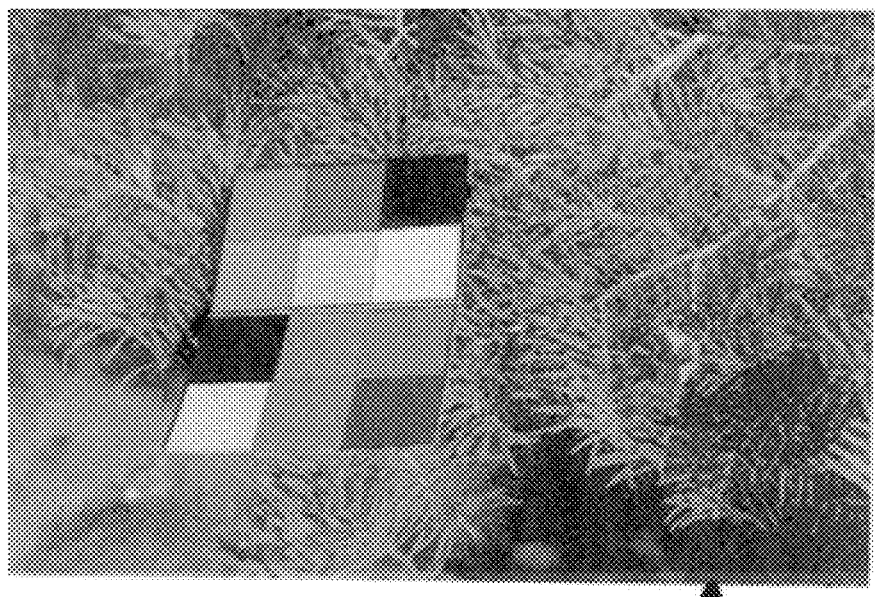
FIG. 9 is a diagram illustrating a typical BestIn image scanned for printing.

Returning to gamut mapping, FIG. 8 is a diagram illustrating calculation of an in-gamut reproduction image according to an alternative embodiment of the present invention. In FIG. 8 the Original Image is always full resolution. The spatial comparisons are made between single pixels that are widely separated (130A), then less separated (130B), then closely separated (130C). This is an example of one of a great many techniques of making multi-scale spatial comparison. Any of which can be used in the process.

Results

The principles of this invention are demonstrated by the following experiment. The BestIn image of FIG. 9 was created by scanning a 35 mm slide. It represents a typical image scanned for printing.

Figure 10:
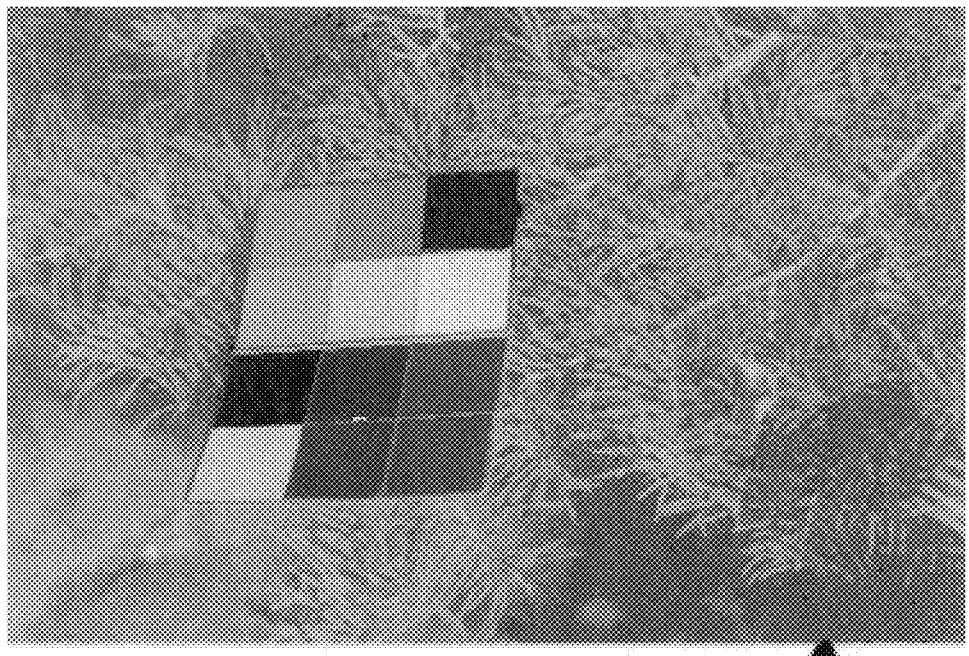
FIG. 10 is a diagram illustrating a GoalIn image created from the BestIn image.

The GoalIn image of FIG. 10 was created from the BestIn image by Photoshop® by pasting the values 255, 0, 0 in place of the red patch scanned values of the 213, 112, 115, etc.

Figure 11:
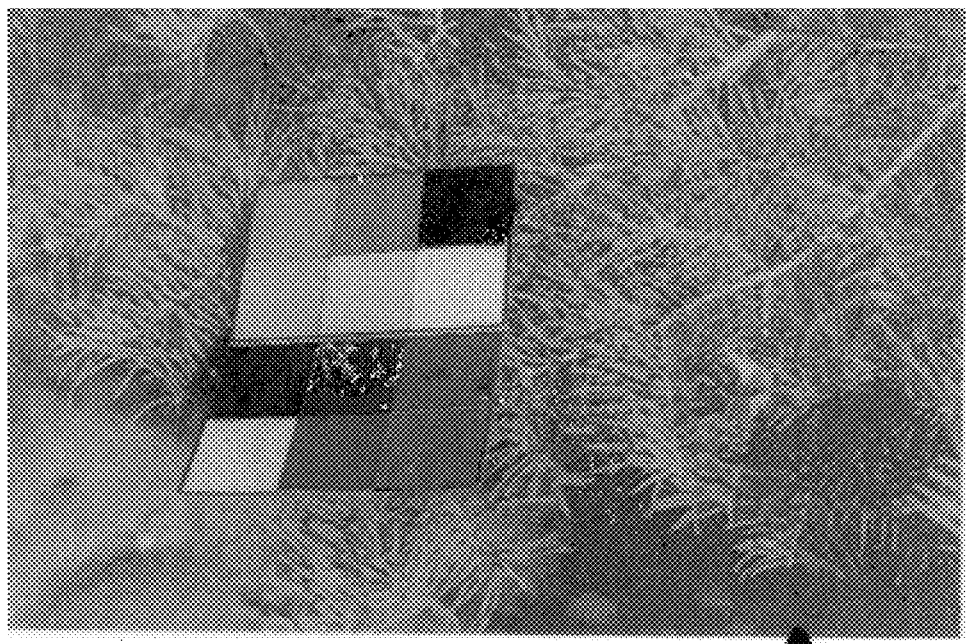
FIG. 11 is a diagram illustrating an in-gamut reproduction image BOUT calculated according to an embodiment of the present invention.

The BOUT image of FIG. 11 was calculated by using the following steps:
1. Create Multi-resolution BestIn
2. Create Multi-resolution GoalIn
3. Separate r, g, b channels
4. Compare value at x,y with x',y'
5. Move up to next resolutions
6. Result separations form full-resolution output As can be seen by comparing the Figures, the BOUT image looks like the GoalIn image despite the fact that it has the color gamut of the BestIn image.

This invention allows the user to calculate new values for all pixels in an image so as to look like another image with completely different calorimetric values. Such images are necessary when the color gamuts of two media are different.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for a captured or generated original image, the original image being a color digital image having an associated original color gamut, the process comprising the steps of:

forming a resulting image within at least one target color gamut by adjusting a plurality of pixel values within the resulting image based on spatial comparisons within the original image.

2. The process as set forth in 1, wherein the spatial comparisons are based on multi-resolution versions of the original image and are applied iteratively.

3. The process as set forth in 2, wherein the spatial comparisons are applied iteratively using progressively higher resolution versions of the original image.

4. The process as set forth in 1, wherein the spatial comparisons are based on multiple distanced comparisons within the original image and are applied iteratively.

5. The process as set forth in 4, wherein the spatial comparisons are applied iteratively using progressively smaller distanced comparisons within the original image.

6. The process as set forth in 1, wherein the original image is separated into a plurality of channel images and the resulting image is formed by combining the channel images after at least one of the channel images has been spatially adjusted.

7. The process as set forth in 1, comprising the step of capturing or generating the original image.

8. The process as set forth in 1, wherein the original image is in a first color space and the resulting image is in a second color space.

9. The process as set forth in 1, comprising the step of outputting the resulting image using an output device having an output color gamut corresponding to the target color gamut.

10. The process as set forth in 1, wherein the original image is used to form an intermediate image within the target color gamut and wherein the spatial comparisons are applied to the intermediate image to form the resulting image.

11. The process as set forth in 10, wherein applying the spatial comparisons includes:

calculating ratios of separation values of different pixels within the original image; and applying the ratios to the intermediate image.

12. The process as set forth in claim 10, further comprising the step of resetting at least one portion of the intermediate image to at least one spot color after applying the spatial comparisons.

13. The process as set forth in claim 10, further comprising the step of resetting the intermediate image to within the target gamut after applying the spatial comparisons.

14. The process as set forth in claim 13, wherein a look-up table is used to reset the intermediate image to within the target gamut after applying the spatial comparisons.

15. The process as set forth in claim 13, wherein pixel-by-pixel mapping is used to reset the intermediate image to within the target gamut after applying the spatial comparisons.

16. The process as set forth in claim 13, wherein morphing is used to reset the intermediate image to within the target gamut after applying the spatial comparisons.

17. The process as set forth in 13, wherein minimum or maximum images are used to reset the intermediate image to within the target gamut after applying the spatial comparisons.

18. A processor for a captured or generated original image, the original image being a color digital image having an associated original color gamut, the process comprising the steps of:

means for determining whether a pixel value is within at least one target color gamut;

means for determining spatial comparisons within the original image; and means for forming a resulting image within the at least one target color gamut by adjusting a plurality of pixel values within the resulting image based on the spatial comparisons within the original image.

19. The processor as set forth in 18, wherein the spatial comparisons are based on multi-resolution versions of the original image and are applied, iteratively.

20. The processor as set forth in 19, wherein the spatial comparisons are applied iteratively using progressively higher resolution versions of the original image.

21. The processor as set forth in 18, wherein the original image is separated into a plurality of channel images and the resulting image is formed by combining the channel images after at least one of the channel images has been spatially adjusted.

22. The processor as set forth in 18, wherein the spatial comparisons are based on multiple distanced comparisons within the original image and are applied iteratively.

23. The processor as set forth in 22, wherein the spatial comparisons are applied iteratively using progressively smaller distanced comparisons within the original image.

24. The processor as set forth in 18, comprising an image capture unit to capture or generate the original image.

25. The process as set forth in 18, comprising an output device to output the resulting image, the output device having an output color gamut corresponding to the target color gamut.

26. The processor as set forth in 18, wherein the original image is in a first color space and the resulting image is in a second color space.

27. The processor as set forth in 18, wherein the original image is used to form an intermediate image within the target color gamut and wherein the spatial comparisons are applied to the intermediate image to form the resulting image.

28. The processor as set forth in claim 27, further comprising means for resetting at least one portion of the intermediate image to at least one spot color after applying the spatial comparisons.

29. The processor as set forth in 27, wherein applying the spatial comparisons includes calculating ratios of separation values of different pixels within the original image and applying the ratios to the intermediate image.

30. The processor as set forth in claim 27, further comprising means for resetting the intermediate image to within the target gamut after applying the spatial comparisons.

31. The processor as set forth in claim 30, wherein a look-up table is used to reset the intermediate image to within the target gamut after applying the spatial comparisons.

32. The processor as set forth in claim 30, wherein pixel-by-pixel mapping is used to reset the intermediate image to within the target gamut after applying the spatial comparisons.

33. The processor as set forth in claim 30, wherein morphing is used to reset the intermediate image to within the target gamut after applying the spatial comparisons.

34. The processor as set forth in 30, wherein minimum or maximum images are used to reset the intermediate image to within the target gamut after applying the spatial comparisons.

35. A process for a captured or generated original image, the original image being a digital image having an associated original dynamic range, the process comprising the steps of:

forming a resulting image within a target dynamic range by adjusting a plurality of pixel values within the resulting image based on spatial comparisons within the original image, wherein the original image is used to form an intermediate image within the target dynamic range and wherein the spatial comparisons are applied to the intermediate image to form the resulting image.

* * * * *